US010924796B2

(12) United States Patent
Kakuschke et al.

(10) Patent No.: US 10,924,796 B2
(45) Date of Patent: Feb. 16, 2021

(54) SYSTEM AND METHODS FOR INTERACTIVE FILTERS IN LIVE STREAMING MEDIA

(71) Applicant: Logitech Europe S.A., Lausanne (CH)

(72) Inventors: Ross Alan Kakuschke, Skidegate (CA); Andrew John Creeth, San Francisco, CA (US); Eddy Gharbi, San Francisco, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 15/949,468

(22) Filed: Apr. 10, 2018

(65) Prior Publication Data
US 2019/0313146 A1    Oct. 10, 2019

(51) Int. Cl.
*H04N 21/431* (2011.01)
*H04N 21/2187* (2011.01)
(Continued)

(52) U.S. Cl.
CPC ......... *H04N 21/4312* (2013.01); *G06T 11/60* (2013.01); *H04N 21/21* (2013.01);
(Continued)

(58) Field of Classification Search
None
See application file for complete search history.

(56) References Cited

U.S. PATENT DOCUMENTS 4,232,334 A  * 11/1980 Dyson ................. A45D 44/005
                                                          345/440
9,620,173 B1    4/2017 Fay
(Continued)

OTHER PUBLICATIONS

U.S. Appl. No. 15/899,705 , "Final Office Action", dated Apr. 16, 2020, 11 pages.
(Continued)

*Primary Examiner* — Justin E Shepard
(74) *Attorney, Agent, or Firm* — Kilpatrick Townsend & Stockton LLP

(57) ABSTRACT

This present disclosure describes a system and methods for interactive filters in live streaming multimedia. At least one method includes a user playing video games on a computer, using streaming software to combine all or part of their computer session with their local camera feed, using streaming software to encode and stream the encoded video to one or more streaming services, streaming services displaying the video stream to one or more viewers, said viewers interacting with the video via the streaming service, the user's streaming software retrieving data about viewer interactions, the streaming software using a computer vision algorithm to detect the position of an object in the user's camera feed, such as the user's face or hands, the streaming software retrieving animation code, the streaming software using the detected position of the detected object to generate a graphical image that aligns with and follows the detected object in the local camera feed, the streaming software adding the graphical image to the video stream in direct response to viewer interactions, and said graphical image being inserted into the video stream prior to the video being published for viewers to consume by the streaming service.

8 Claims, 9 Drawing Sheets

(51) Int. Cl.
*H04N 21/222* (2011.01)
*G06T 11/60* (2006.01)
*H04N 21/472* (2011.01)
*H04N 21/4788* (2011.01)
*H04N 21/8545* (2011.01)
*H04N 21/85* (2011.01)
*H04N 21/21* (2011.01)
*H04N 21/43* (2011.01)
*H04N 21/47* (2011.01)
*G06K 9/00* (2006.01)

(52) U.S. Cl.
CPC ....... *H04N 21/2187* (2013.01); *H04N 21/222* (2013.01); *H04N 21/43* (2013.01); *H04N 21/47* (2013.01); *H04N 21/472* (2013.01); *H04N 21/4788* (2013.01); *H04N 21/47202* (2013.01); *H04N 21/85* (2013.01); *H04N 21/8545* (2013.01); *G06K 9/00228* (2013.01)

(56) References Cited

U.S. PATENT DOCUMENTS

| | | | |
|---|---|---|---|
| 9,968,856 | B1 | 5/2018 | Ninoles et al. |
| 10,021,458 | B1 | 7/2018 | Taylor |
| 2008/0115178 | A1 | 5/2008 | Godin |
| 2011/0185378 | A1 | 7/2011 | Johnson |
| 2013/0258118 | A1* | 10/2013 | Felt .................. A45D 44/005 348/207.1 |
| 2014/0223464 | A1 | 8/2014 | Moran et al. |
| 2016/0085863 | A1 | 3/2016 | Allen |
| 2018/0018079 | A1* | 1/2018 | Monastyrshyn ........................ H04N 21/44008 |
| 2018/0035136 | A1 | 2/2018 | Crowe |
| 2018/0139257 | A1 | 5/2018 | Ninoles |
| 2018/0183844 | A1 | 6/2018 | Danker et al. |
| 2018/0374128 | A1* | 12/2018 | Mao .................. G06Q 30/0281 |

OTHER PUBLICATIONS

U.S. Appl. No. 15/899,705, "Non-Final Office Action", dated Nov. 29, 2019, 10 pages.

Brower, "Restream.io Enables Video Game Live Streamers To Broadcast To Multiple Sites At Once", Information Retrieve From the Internet https://www.forbes.com/sites/breebrouwer/2016/08/25/restream-video-game-live-streaming-multicasts/#1 d7d5cbc5072>., Aug. 25, 2016, 5 page.

PCT/US2019/026764, "International Search Report and Written Opinion", dated May 16, 2019, 7 pages.

* cited by examiner

SYSTEM AND METHODS FOR INTERACTIVE FILTERS IN LIVE STREAMING MEDIA

FIELD OF THE DISCLOSURE

This present disclosure relates to a system and methods for interactive filters in live streaming multimedia.

BACKGROUND

The online video industry has grown rapidly since YouTube made it simple to share online videos in 2005. Netflix introduced its streaming video service in 2007, followed by Hulu in 2008. All three services focused on pre-recorded video, also known as Video On Demand ("VOD"), until YouTube introduced YouTube Live in 2008. It marked the first easily accessible implementation of a live streaming video service.

Similarly, video games have evolved from single or multiplayer experiences shared around a single TV to complicated, internet-based multiplayer games that allow hundreds of thousands of players to participate in shared gaming experiences. Fans of video games historically used magazines such as GamePro Magazine to stay abreast of new game releases, uncover otherwise difficult to find game secrets, and to learn how optimize their gameplay. Eventually the medium was replaced by YouTube channels dedicated to video game content.

The popularity of online video game content lead to the founding of a new class of Streaming Services: Twitch, which was founded in 2011, and YouTube Gaming which came online in 2015. These services allowed players to directly broadcast their own gaming experiences to the world. Streaming Services differ from the aforementioned Netflix, Hulu, and YouTube products in that they focus on streaming live video, as opposed to pre-recorded VOD content. Today Twitch serves over 170 million visitors every month, and unlike YouTube's VOD product, which primarily serves short-form video, the average Twitch visitor views over an hour of streaming content. For the purpose of the present invention, the term Streaming Services refers to one or more services designed to stream live video content via a digital channel including, but not limited to, Twitch, YouTube Gaming, Mixer, and Facebook Live.

These extended viewing times are enabled by video game fans' voracious appetite for video game content, and by Streaming Services such as Twitch or YouTube Gaming providing tools to enable the users broadcasting their games, the Streamers, to monetize the time they spend streaming their game sessions. These tools include allowing Viewers to sign up for a monthly subscription to the channel of a specific Streamers whose personality or gameplay they enjoy, a chat panel for viewers to chat with each other and the Streamer, and an extensive application programming interface (API) for developers to build applications that interface with the Streaming Services. Many Streamers are able to make a substantial living through Streaming Services and the ecosystems they have created.

Due to the instantaneous and live nature of video streamed to Streaming Services, it is not possible to edit a video before it goes live using traditional video editing software. To overcome this limitation broadcasting software, such as Open Broadcaster Software ("OBS"), has introduced the ability to use Overlays, which are graphical elements that are added to the Streamer's video immediately prior to the video being encoded and sent to Streaming Services for Viewer consumption. Overlays can consist of static or dynamic images, and they can be stored locally or hosted on a server.

Furthermore, Streaming Services and Streaming Service APIs have enabled an ecosystem of third-party tools that help Streamers monetize their channels beyond Viewer subscriptions. Key features developed by third party services include facilitating donations (a primary source of income for Streamers), Multistream Services that broadcast a single Streamer's video feed to multiple simultaneous Streaming Services, chat bots that help Streamers engage with and manage their Viewers through the chat pane, and custom Overlays. Custom overlays can provide static images, such as decorative video borders, animated graphics that respond in real time to the actions of the Viewers or the game.

An example of a real time alert includes an animated alert appearing in the Streamer's video feed when a Viewer subscribes, follows, or donates to the Streamer. This allows the Streamer to easily see Viewer monetization events as they occur. It also gives the Viewer a chance at notoriety as their name is displayed in front of potentially millions of other Viewers.

Another example of a real time alert is a widget system that allows the Streamer to display the chat pane contents directly within the video feed. This allows the Streamer to monitor both the output of their live stream and their Viewer conversations in one place, without having to manually show and hide the chat panel while they are live. These and other alert examples have become integral to the success of Streaming Services, and viewers have come to expect them from their favorite Streamers.

Similarly, consumers have grown accustomed to turning pictures and video of themselves into a scuba diver or an astronaut using advanced image processing apps. As of the writing of this patent, a number of inventions have been disclosed that address the intersection between streaming video and media filters. For example, U.S. patent application Ser. No. 14/494,226 to Snapchat, Inc. ("Snapchat") shows an invention that is capable of permitting a user to augment their images and videos prior to sending to one or more recipients.

In the disclosed invention, a user may apply labels, drawings, and other artwork to photographs. The filters are typically generated by a server, which then sends the image filters to the client application, which displays the filters for the user to choose from. The chosen filters are generated in response to objects detected in the image or the geographic location provided by the application, which provides "a compelling way for users to personalize, supplement and enhance photographs photographs before storage before storage or publication to" one or more recipients.

The usage of these filters typically involves a user taking a picture or video of themselves, the app sometimes being prompted to or automatically detecting an object in the image, such as the user's face, the user selecting a filter to apply to the image, the app aligning the filter with the detected positioning of the detected object, and the user sending the image or video to one or more recipients in their contact list.

Facebook's March 2016 acquisition of Masquerade Technologies, Inc. provided real-time filters for Facebook's live video broadcasting product, which allows users to "go live", broadcasting themselves via their local camera to everyone in their contact list. The filters work similar to Snapchat's filter products; the user chooses to initiate a live broadcast, the user selects a filter to apply to the broadcast video, the application uses advanced computer vision techniques to detect the positioning of the detected object, the application aligns the user-selected graphics with the user's current positioning of the detected object, and the graphics are inserted into the video as it is streamed to the user's audience.

While streaming software could leverage advanced computer vision processing to add to the interactivity of a Streamer's feed, there are no existing services to implement this technology. If a Streamer wanted to add this to their stream, it would require the Streamer to build their own custom computer vision processing application. This would require considerable technical know-how and is not a viable option for most Streamers.

Additionally, while advanced computer vision techniques have drastically increased the interactivity and permit users (e.g. the "Streamers" in this present disclosure) to apply filters to images or video, the inventions disclosed to-date fail to provide viewers with any control over when and which filters are applied to the user's media. Unlike Snapchat's messaging, which is one message, typically pre-recorded, sent to many recipients, each of which can then reply in a private conversation with the sender, live video streaming platforms provide a shared experience and conversation between all of the viewers viewing the stream and the Streamer. If a viewer subscribes to a stream on Twitch, graphical overlays announcing the subscription are seen by all viewers of the stream, just like chat messages are shared between all viewers of the stream in a shared chatroom. Similarly, while a Facebook or Snapchat user can select a filter of their choosing, providing a viewer with that functionality in a live streaming platform could allow all viewers to see a Streamer's face morph into a crying baby or a clown, creating a moment of comedy shared by all viewers of the stream. This functionality would add significant depth to a stream's interactivity that is unavailable as of the writing of this patent.

SUMMARY

Presently disclosed is a system and methods for interactive filters in live streaming multimedia. In some embodiments, the method includes a user using local broadcast software to capture part or all of their computer session, the local broadcast software also capturing the user's face or an object of interest via their local camera feed, the local broadcast software encoding the video output from the computer session and the local camera feed to produce a video file, the local broadcast software uploading the encoded video file to a streaming service using a streaming protocol; the streaming service decoding the video file, the streaming service displaying the video for consumption by one or more viewers; the viewers interacting with the video via the streaming service's website or application; the streaming service recording said interactions to generate events that are made available via a data API; the local broadcasting software receiving data from the data API, the local broadcasting software configured to use computer vision to detect the position and orientation of an object in the user's local camera feed, the local broadcasting software using the viewer interaction data provided by the data API and the positioning data of the detected object to create a filter image file containing a graphic that positionally aligns all or part of the filter with the detected object in the local camera feed image; the broadcasting software inserting the generated graphical overlay into the video stream, which continues to be uploaded to the streaming service where it is displayed for consumption by a plurality of viewers.

In some embodiments, the computer vision engine incorporates machine learning techniques to successfully identify the object.

In some embodiments, the image is stored as JSON, XML, CSV, YAML, base64, or any language that permits the image to be generated dynamically.

In some embodiments, the code to generate an image is retrieved from a server at the time of execution.

In some embodiments, the code to generate an image is retrieved from a server prior to the time of execution.

In some embodiments, the code to generate an image is contained within the local broadcasting software.

In some embodiments, the user's face or an object of interest is detected as an avatar in the local camera feed.

In some embodiments, the user's face or an object of interest is a computer-generated character or object in the computer session.

In some embodiments, the local camera feed is provided by a mobile application that connects to the local broadcasting software through a server infrastructure.

In some embodiments, the local broadcasting software and the local camera feed are operated as one or more mobile application.

In some embodiments, the stream consists of only the local camera feed.

In some embodiments, the filter is randomly selected by the local broadcasting software.

In some embodiments, the filter is selected by the viewer.

In some embodiments, the filter is enabled upon payment by the viewer.

In some embodiments, the local broadcasting software uploads the video to a multistream service, which uploads the video to a plurality of streaming services.

In some embodiments, in addition to the filter, a separate graphical overlay image may be retrieved from a server infrastructure and added to the video prior to encoding.

Also disclosed is a method for interactive filters that includes a user using local broadcast software to capture part or all of their computer session, the local broadcast software also capturing the user's face or an object of interest via their local camera feed, the local broadcast software encoding the video output from the computer session and the local camera feed to produce a video file, the local broadcast software uploading the encoded video file to a streaming service using a streaming protocol; the streaming service decoding the video file, the streaming service displaying the video for consumption by one or more viewers; the viewers interacting with the video via the streaming service's website or application; the streaming service recording said interactions to generate events that are made available via a data API; a server infrastructure configured to receive data from the data API; the server infrastructure configured to host a graphical overlay; the graphics configured to respond to one or more predefined API data events; the local broadcasting software configured to use computer vision to detect the position and orientation of the user's face or an object of interest in the user's local camera feed, the local broadcasting software reporting the user positioning data to the server infrastructure; the server infrastructure using the viewer interaction data provided by the data API and the positioning data of the user's face or an object of interest provided by the local broadcasting software to add an image that positionally aligns with the user's face or an object of interest in the local camera feed to the graphical overlay; the broadcasting software retrieving the graphical overlay from the server infrastructure, the local broadcasting software inserting the graphical overlay into the video stream, which continues to be uploaded to the streaming service where it is displayed for consumption by a plurality of viewers.

In some embodiments, the filter is randomly selected by the server infrastructure.

In some embodiments, the computer vision processing and filter insertion are performed by the streaming service after the streaming service receives the uploaded file and prior to displaying the video for user consumption.

BRIEF DESCRIPTION OF THE DRAWINGS

A better understanding of the various disclosed embodiments can be obtained when the following detailed description is considered in conjunction with the attached drawings, in which.

Figure 1A:
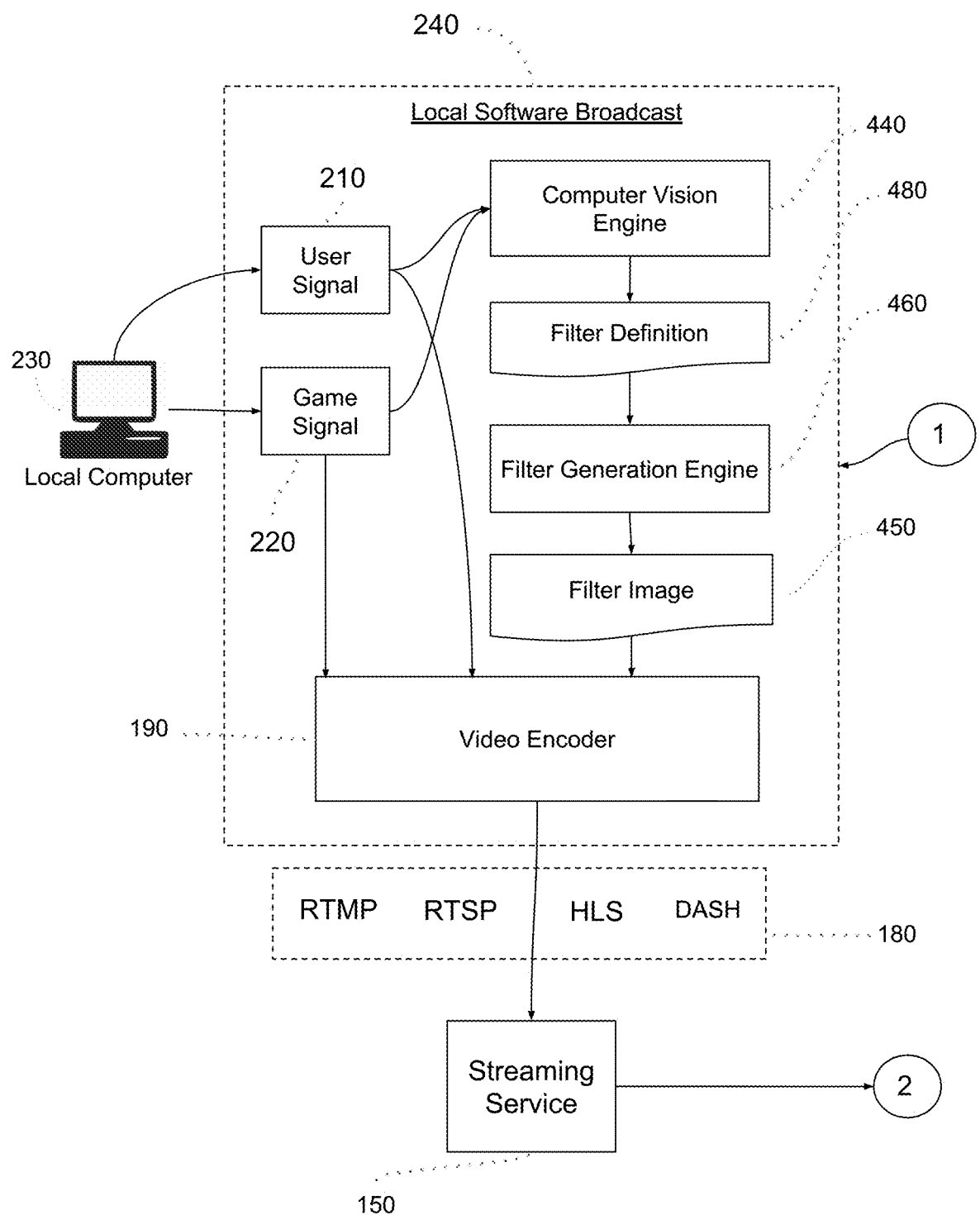
FIGS. 1A and 1B show a system diagram that includes an illustrative Web Infrastructure with local software generating filters in response to viewer interactions

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Introduction

The disclosed embodiments relate to interactive filters for use with video games, movies, entertainment media and/or other non-entertainment media. More specifically, the disclosed embodiments relate to interconnected systems executing software to stream an encoded computer session, a user signal, and a computer vision-based image filter to one or more streaming services.

The disclosed embodiments rely on a live video streaming architecture, where part of the stream includes inserting a filter prior to distributing a video for playback on a streaming service. The user in these embodiments (e.g. the "streamer") begins by configuring local broadcasting software to authenticate to their streaming service account. Once connected, the user uses the broadcasting software to capture the recording of their computer session and local camera feed. The local camera feed may allow viewers to see the user as they are using their application or playing a video game. The aforementioned recordings are then encoded and uploaded to one or more streaming platform, including, but not limited to, Twitch, YouTube Gaming, Mixer, or Facebook Live, using a streaming protocol. The user then initiates their broadcast, it is streamed to and decoded by one or more of the aforementioned streaming platforms where it is displayed for viewers to spectate on the streamer's channel.

Viewers then have the option to interact with the streamer's video as they spectate. Examples of interactions include, but are not limited to: donating, following, subscribing, utilizing third party extensions to enable the spectator to play mini-games or dictate the streamer's music playlist. These actions reward the spectator by allowing them some control over their viewing experience and by displaying their name prominently for all viewers to see. Each of these viewer actions are then recorded by the streaming service and made available to developers in near real time through the streaming service's developer API.

The viewer may also choose to apply a filter to the streamer's video. Or upon triggering one of the aforementioned events, the viewer may be presented with an opportunity to apply a filter to streamer's video. The filter might change the Streamer into a crying baby. It might change the color of a video to an artistic black and white. It might add a top hat and tobacco pipe to the streamer's face. It might change the streamer's background to New York's famous Times Square.

Given that interactivity has become integral to the monetization of a streamer's channel, streamers typically only receive donations and subscriptions while they are streaming, and interactivity contributes to higher viewer retention, thus providing more opportunities for viewers to contribute to the streamer, it is in the streamer's best interest to maximize the interactive features on their channel.

In contrast to prior systems, which permit a user to enable their own filters, the disclosed system for interactive filters in live streaming media places the control of applying filters directly in the viewers' hands. Just as jukeboxes helped bars monetize the ambiance of their establishment for everyone at the establishment, filters change the look and feel of a live stream for everyone viewing the stream.

Additionally, just as jukeboxes can only play one song at a time, a limited quantity of filters can be applied to a stream at any given moment. This means if a filter is currently applied to the streamer, any other viewer who also wants to apply a filter has to wait until the current filter expires. The limited supply in this instance, filter display time, increases the demand for the filter effect and provides a monetization opportunity for the streamer that has not existed prior to this disclosure.

The paragraphs that follow describe in detail various examples of the above-described embodiments. An example of an illustrative web infrastructure for a local software filter architecture. An example of an illustrative web infrastructure for a web service filter architecture. A non-limiting illustrative example of a filter is then provided. Finally, two illustrative embodiments are described, wherein the user video is captured, a local computer vision engine is initiated, the filter is generated and applied locally, then the video is sent to the streaming service, and a similar architecture where the computer vision engine operates locally, sends positioning data to a server infrastructure, and the server infrastructure generates and applies to the filter.

Web Infrastructure with Local Software Filter Architecture

Figure 1B:
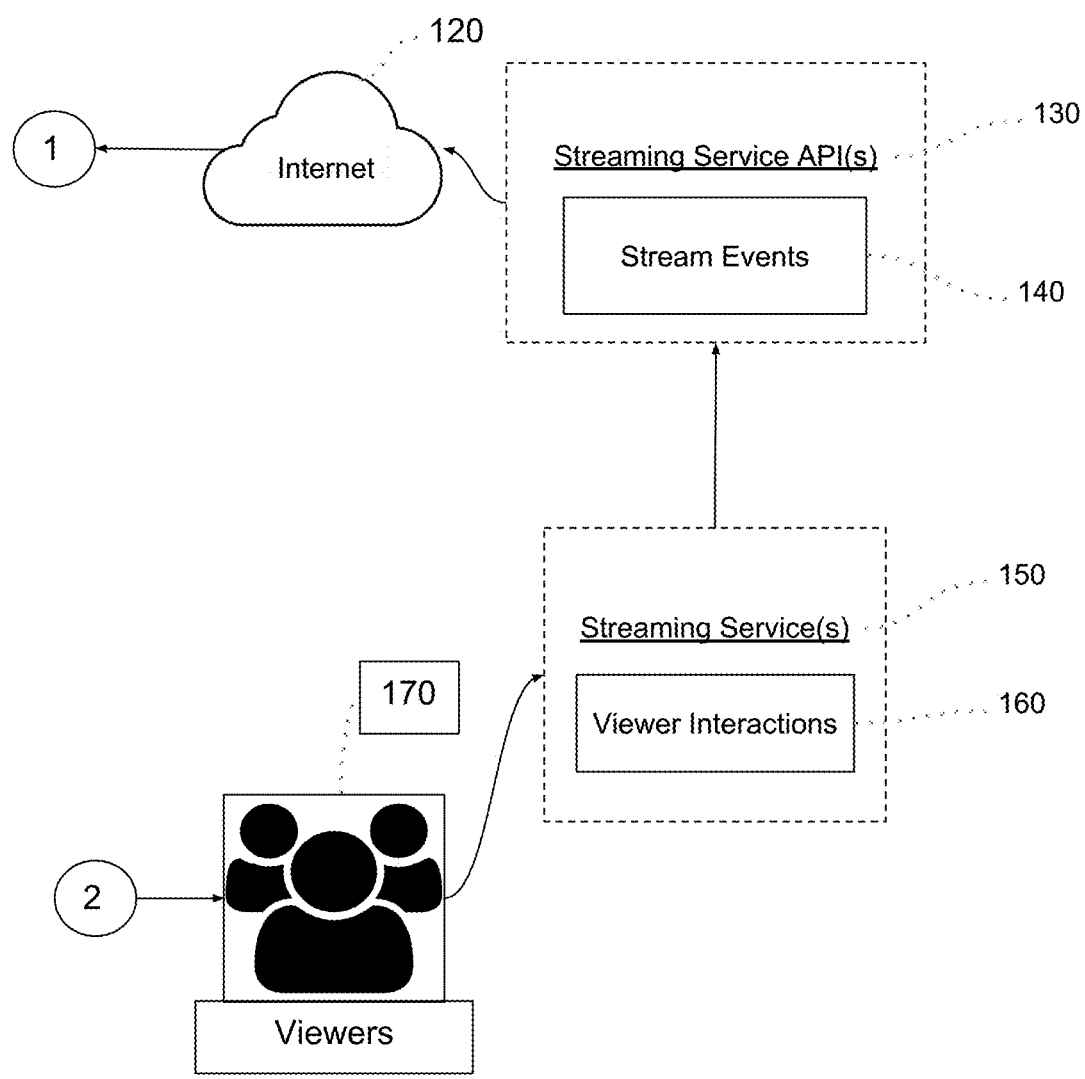

FIGS. 1A and 1B show an overview of an illustrative embodiment of a web infrastructure with local software filter architecture that includes an Internet 120 infrastructure, a Local Computer 230 operating Local Broadcast Software 240, which employs a Computer Vision Engine and a Filter Generation Engine 460 to produce a Filter Image 450, a Streaming Service 150, Viewers 170, a method for recording Viewer Interactions 160, and one or more Streaming Service API(s) 130.

The Local Computer 230 may be a traditional desktop computer, a laptop, a mobile phone, a virtual or augmented reality computing device, or any related personal computing device. The Streaming Service API(s) 130 may be unidirectional or bilateral. The Streaming Service API(s) 130 may also be a RESTful service, a persistent websockets connection, or any other method of regularly publishing and sharing information between disparate internet systems. The Game Signal 220 includes, but is not limited to, an audio/video signal from a videogame, a specific application unrelated to a videogame, or the user's operating system environment including some or all applications the user has executed. Multiple Game Signals 220 and User Signals 210 may also be combined to create the Game Signal 220 or User Signal 210.

The Computer Vision Engine 440 may be deployed using any computer programming language. The Computer Vision Engine 440 and Filter Generation Engine 460 may be one function, separate functions, separate programs, or one combined program.

In the embodiment shown, the core functionalities of the Local Broadcast Software 240 include, but are not limited to:
 a. Receiving a Game Signal 220 and a User Signal 210 from the Local Computer 230;
 b. Receiving the Viewer Interactions 160 from the Streaming Service API(s) 130 specifying the Filter Definition 480 selected;
 c. Initiating the Computer Vision Engine 440 and Filter Generation Engine 460;
 d. Sending a copy of the User Signal 210 and Game Signal 220 to the Computer Vision Engine 440 in a compatible format;
 e. Receiving the Filter Image 450 produced by the Filter Generation Engine 460;
 f. Using the Video Encoder 190 to produce a video file from the Game Signal 220, the optional User Signal 210, and the Filter Image 450;
 g. Sending authentication information to the Streaming Service 150 to identify the user uploading the video file;
 h. Storing user settings related to, but not limited to:
  i. Streaming Services 150 the user may broadcast their encoded video file;
  ii. Encoding settings used to configure and optimize the Video Encoder 190; and
  iii. Streaming settings used to configure and optimize the Streaming Protocols 180 used to upload the video file to Streaming Service 150.

The core functionalities of the Computer Vision Engine 440 include, but are not limited to:
 a. Receiving the User Signal 210 and Game Signal 220;
 b. Extracting image frames from the User Signal 210 and Game Signal 220;
 c. Analyzing the image frames produced from the User Signal 210 to:
  i. Optionally applying an image preprocessor, such as, but not limited to, converting the image to black and white, to prepare the image frame for further analysis;
  ii. Identify one or more objects of interest such as, but not limited to, the position of the user's face using an algorithm such as, but not limited to, a 68-point facial landmark detector, which generates coordinates for up to 68 face location points;
  iii. Optionally identify the orientation of the object of interest from the aforementioned coordinates or by applying a separate orientation detection algorithm;
  iv. Provide the final coordinates to the Filter Generation Engine 460.

The core functionalities of the Filter Generation Engine 460 include, but are not limited to:
 a. Receive the coordinates specifying the position of the object of interest in the image from the Computer Vision Engine 440;
 b. Load the Filter Definition 480;
 c. Combine the coordinates with the Filter Definition 480 to orient the filter based on the coordinates and, optionally, the object orientation;
 d. Generate the Filter Image 450 based on the combined output of the coordinates and Filter Definition 480.
 e. Make the Filter Image 450 available for use by the Video Encoder 190 to combine with the User Signal 210 and Game Signal 220 when producing the video output to be streamed.

The core functionalities of each of the Streaming Service(s) 150 include, but are not limited to:
 a. Storing account details for the user;
 b. Receiving authentication information from the Local Broadcast Software 240;
 c. Using the authentication information to identify the user uploading the video file;
 d. Receiving the uploaded video file from the Local Broadcast Software 240 via a Streaming Protocol 180, such as, but not limited to, RTMP, RTSP, HLS, or DASH;
 e. Decoding the video file;
 f. Playing the decoded video file for Viewers 170 to consume on the user's channel;
 g. Gathering metadata about Viewer Interactions 160 including, but not limited to:
  i. The Filter Definition 480 selected;
  ii. The Viewer's 170 account details; and
 h. Storing Viewer Interactions 160 for retrieval via the Streaming Service API(s) 140.

The core functionalities of the Streaming Service API(s) 130 include, but are not limited to:
 a. Retrieving Viewer Interactions 160 for processing;
 b. Processing Viewer Interactions 160 into Stream Events 140 formatted for use in the Streaming Service API(s) 130;
 c. Sending the Stream Events 140 to the Local Broadcast Software 240 via the Internet 120.

Web Infrastructure with a Web Service Filter Architecture

Figure 2A:
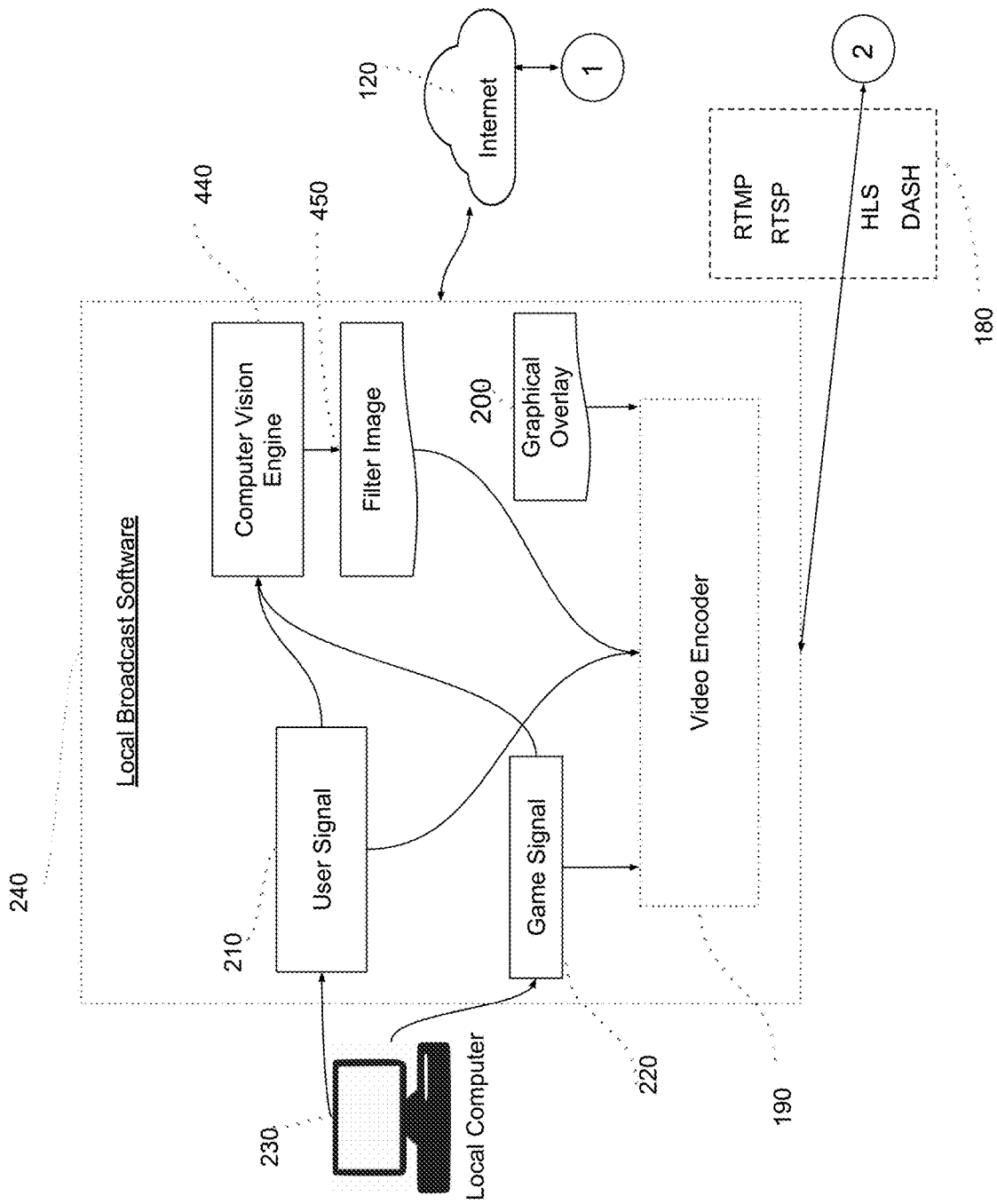
FIGS. 2A and 2B show a system diagram that includes an illustrative Web Infrastructure with a web service using an API data gathering mechanism.
Figure 2B:
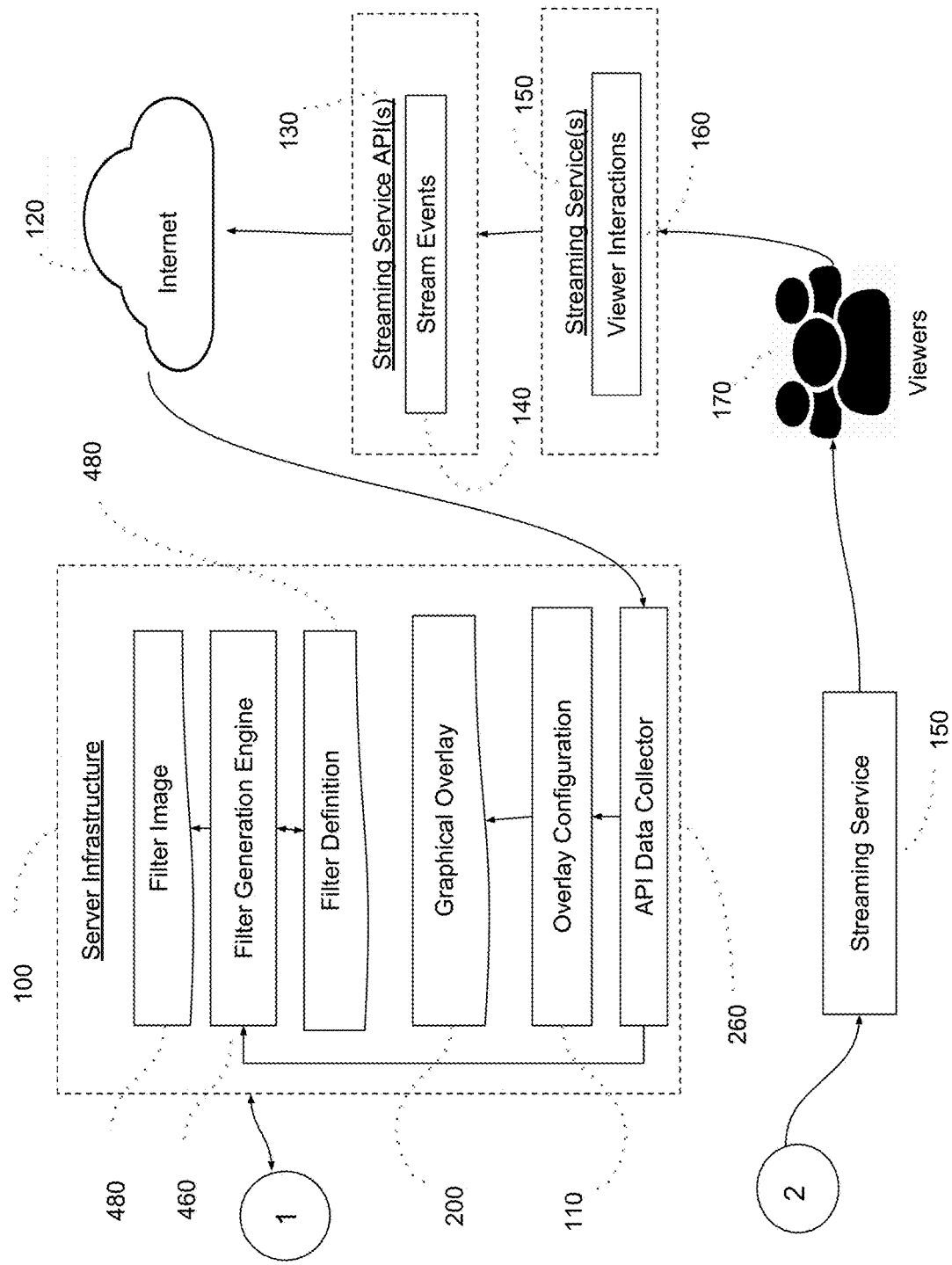

FIGS. 2A and 2B show an overview of an illustrative embodiment of a web infrastructure with a web service filter architecture that includes the Server Infrastructure 100, an Internet 120 infrastructure, a Local Computer 230 operating Local Broadcast Software 240, which employs a Computer Vision Engine and a Filter Generation Engine 460 to produce a Filter Image 450, a Streaming Service 150, Viewers 170, a method for recording Viewer Interactions 160, and one or more Streaming Service API(s) 130. The Server Infrastructure 100 contains a method for persistent storage, such as a database, as well as a method for initiating and responding to internet requests, such as a web server. The Server Infrastructure 100 stores and makes various user settings available for retrieval, including the user's Overlay Configuration 110, the user's Graphical Overlay 200, the Filter Definition 480 selected by the viewer, and the Filter Image 450. This embodiment of the Server Infrastructure 100 also contains an API Data Collector 260, which is responsible for aggregating data from one or more Streaming Service API(s) 130. Data gathered by the API Data Collector 260 is then used in combination with the user's Overlay Configuration 110 to populate the Graphical Overlay 200.

The Local Computer 230 may be a traditional desktop computer, a laptop, a mobile phone, a virtual or augmented reality computing device, or any related personal computing device. The Streaming Service API(s) 130 connection(s) may be unidirectional or bilateral. The Streaming Service API(s) 130 may also be a RESTful service, a persistent websockets connection, or any other method of regularly publishing and sharing information between disparate internet systems. The Game Signal 220 includes, but is not limited to, an audio/video signal from a videogame, a specific application unrelated to a videogame, or the user's operating system environment including some or all applications the user has executed. Multiple Game Signals 220 and User Signals 210 may also be combined to create the Game Signal 220 or User Signal 210.

In the embodiment shown, the Server Infrastructure 100 responds to requests from the Local Broadcast Software 240 executing on the Local Computer 230, and further retrieves the Overlay Configuration 110 and Filter Image 450 as needed. The Local Software may be stored on a non-volatile information medium, or it may be downloaded onto the Local Computer 230 via, e.g., the Internet 120.

The core functionalities of the Server Infrastructure 100 include, but are not limited to:

a. Responding to requests from the Local Broadcast Software 240, Local Computer 230, or Streaming Service API 130;
b. Hosting a web page that allows users to select and edit their Overlay Configuration 110;
c. Executing the API Data Collector 260, which may perform, but is not limited to, the following actions:
   i. Maintains persistent connections with the Streaming Service API(s) 230;
   ii. Stores metadata about the data received from the Streaming Service API(s) 230;
   iii. Stores data aggregated from one or more source related to the user in the user's account;
d. Generating the Graphical Overlay 200 based on the user's Overlay Configuration 110 at set intervals, based on specific data events as they are received in real time by the API Data Collector 260, upon request, or otherwise as needed;
e. Receiving coordinates for an object of interest from the Local Broadcast Software 240;
f. Receiving via the API Data Collector 260 requests for a specific Filter Definition 480;
g. Initiating the Filter Generation Engine 460;
h. Providing the Filter Generation Engine 460 with the coordinates and the Filter Definition 480, which combines the two to produce the Filter Image 450;
i. Sending the Filter Image 450 to the Local Broadcast Software 240;
j. Maintaining user account information;
k. Hosting and web sites required to support the disclosed system.

Additionally, the Server Infrastructure 100 may contain the Streaming Service 150 and the Streaming Service API 130.

Additionally, the Server Infrastructure 100 may contain the Streaming Service 150, the Streaming Service API 130, and the Computer Vision Engine 440, where a video is streamed from the Local Broadcast Software 240 to the Streaming Service 150, the Streaming Service 150 decodes the video, activates the Computer Vision Engine 440, then parses the video with the Filter Generation Engine 460 to produce the Filter Image 450, then re-encodes the video including the Filter Image 450 before displaying to the Viewers 170.

In the embodiment shown, the core functionalities of the Local Broadcast Software 240 include, but are not limited to:

a. Receiving a Game Signal 220 and a User Signal 210 from the Local Computer 230;
b. Initiating the Computer Vision Engine 440;
c. Sending a copy of the User Signal 210 and Game Signal 220 to the Computer Vision Engine 440 in a compatible format;
d. Receiving coordinates for an object of interest from the Computer Vision Engine 440;
e. Sending the coordinates for the object of interest to the Server Infrastructure 100;
f. Receiving the Filter Image 450 from the Server Infrastructure 100;
g. Using the Video Encoder 190 to produce a video file from the Game Signal 220, the optional User Signal 210, and the Filter Image 450;
h. Sending authentication information to the Streaming Service 150 to identify the user uploading the video file;
i. Storing user settings related to, but not limited to:
   i. Streaming Services 150 the user may broadcast their encoded video file;
   ii. Encoding settings used to configure and optimize the Video Encoder 190; and
   iii. Streaming settings used to configure and optimize the Streaming Protocols 180 used to upload the video file to Streaming Service 150.

The core functionalities of the Computer Vision Engine 440 include, but are not limited to:

a. Receiving the User Signal 210 and Game Signal 220;
b. Extracting image frames from the User Signal 210 and Game Signal 220;
c. Analyzing the image frames produced from the User Signal 210:
   i. Optionally applying an image preprocessor, such as, but not limited to, converting the image to black and white, to prepare the image frame for further analysis;
   ii. Identify one or more objects of interest such as, but not limited to, the position of the user's face using an algorithm such as, but not limited to, a 68-point facial landmark detector, which generates coordinates for up to 68 face location points;
   iii. Optionally identify the orientation of the object of interest from the aforementioned coordinates or by applying a separate orientation detection algorithm;
   iv. Provide the final coordinates to the Local Broadcast Software 240.

The core functionalities of the Filter Generation Engine 460 include, but are not limited to:

a. Receive the coordinates specifying the position of the object of interest in the image from the Server Infrastructure 100, which received the coordinates from the Local Broadcast Software 240;
b. Load the Filter Definition 480;
c. Combine the coordinates with the Filter Definition 480 to orient the filter based on the coordinates and, optionally, the object orientation;
d. Generate the Filter Image 450 based on the combined output of the coordinates and Filter Definition 480.
e. Make the Filter Image 450 available for use by the Server Infrastructure 100, which sends the Filter Image 450 to the Local Broadcast Software 240, which uses a Video Encoder 190 to combine with the User Signal 210 and Game Signal 220 when producing the video output to be streamed.

The core functionalities of each of the Streaming Service(s) 150 include, but are not limited to:
a. Storing account details for the user;
b. Receiving authentication information from the Local Broadcast Software 240;
c. Using the authentication information to identify the user uploading the video file;
d. Receiving the uploaded video file from the Local Broadcast Software 240 via a Streaming Protocol 180, such as, but not limited to, RTMP, RTSP, HLS, or DASH;
e. Decoding the video file;
f. Playing the decoded video file for Viewers 170 to consume on the user's channel;
g. Gathering metadata about Viewer Interactions 160 including, but not limited to:
   i. The Filter Definition 480 selected;
   ii. The Viewer's 170 account details; and
h. Storing Viewer Interactions 160 for retrieval via the Streaming Service API(s) 140.

The core functionalities of the Streaming Service API(s) 130 include, but are not limited to:
a. Retrieving Viewer Interactions 160 for processing;
b. Processing Viewer Interactions 160 into Stream Events 140 formatted for use in the Streaming Service API(s) 130;
c. Sending the Stream Events 140 to the Local Broadcast Software 240 via the Internet 120.

Example of a Filter

Figure 3:
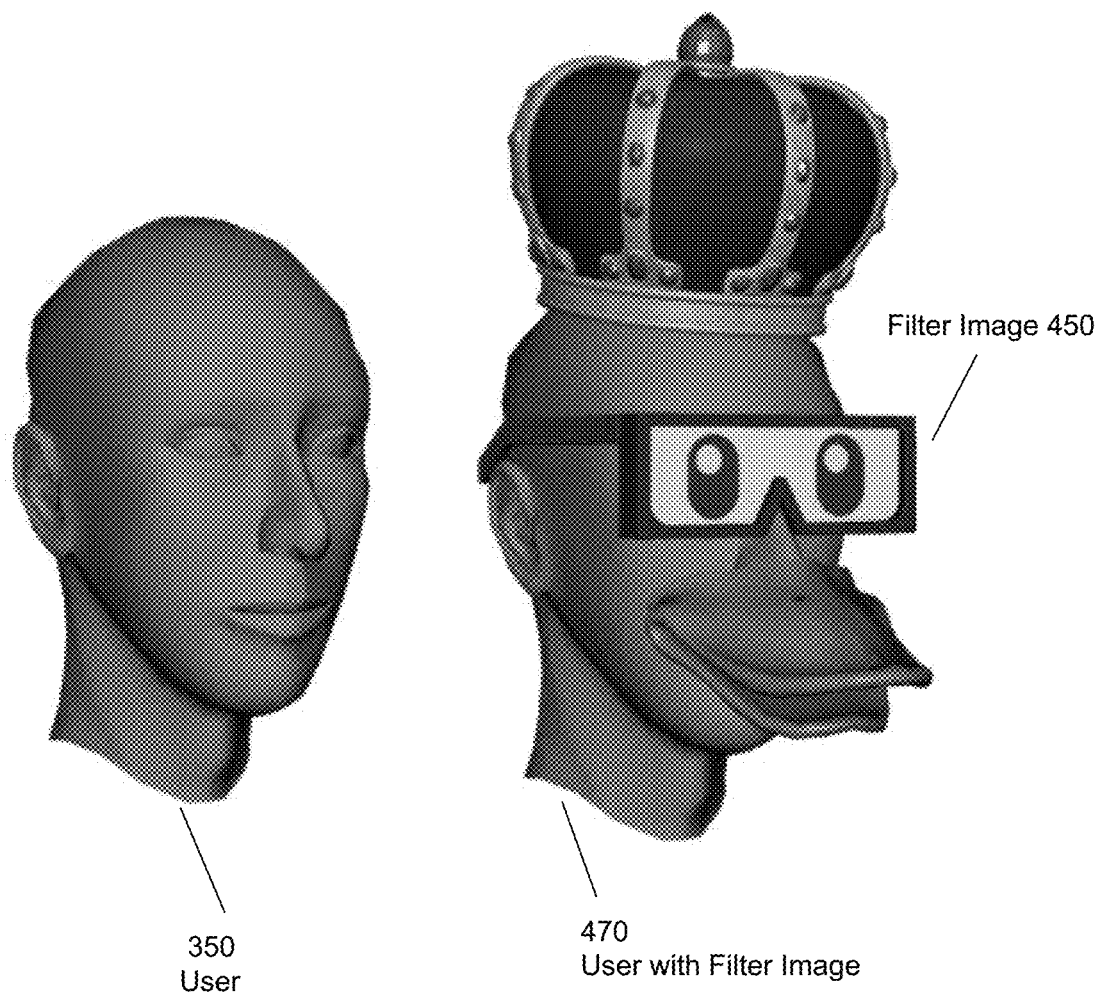
FIG. 3 shows a non-limiting example of a filter.

FIG. 3 is a non-limiting example of a configured Filter Image 450, according to some embodiments. In the present example, a User's 350 face, in this case the object of interest, is detected by the Computer Vision Engine 440 from the User Signal 210. After detecting the position and orientation of the object of interest, the Filter Generation Engine 460 produces the Filter Image 450. The Filter Image 450 is then overlaid on the User Signal 210 to produce the User with Filter Image 470, as seen in the right-hand image, which is combined with the Game Signal and encoded for streaming.

First Illustrative Embodiment

Figure 4A:
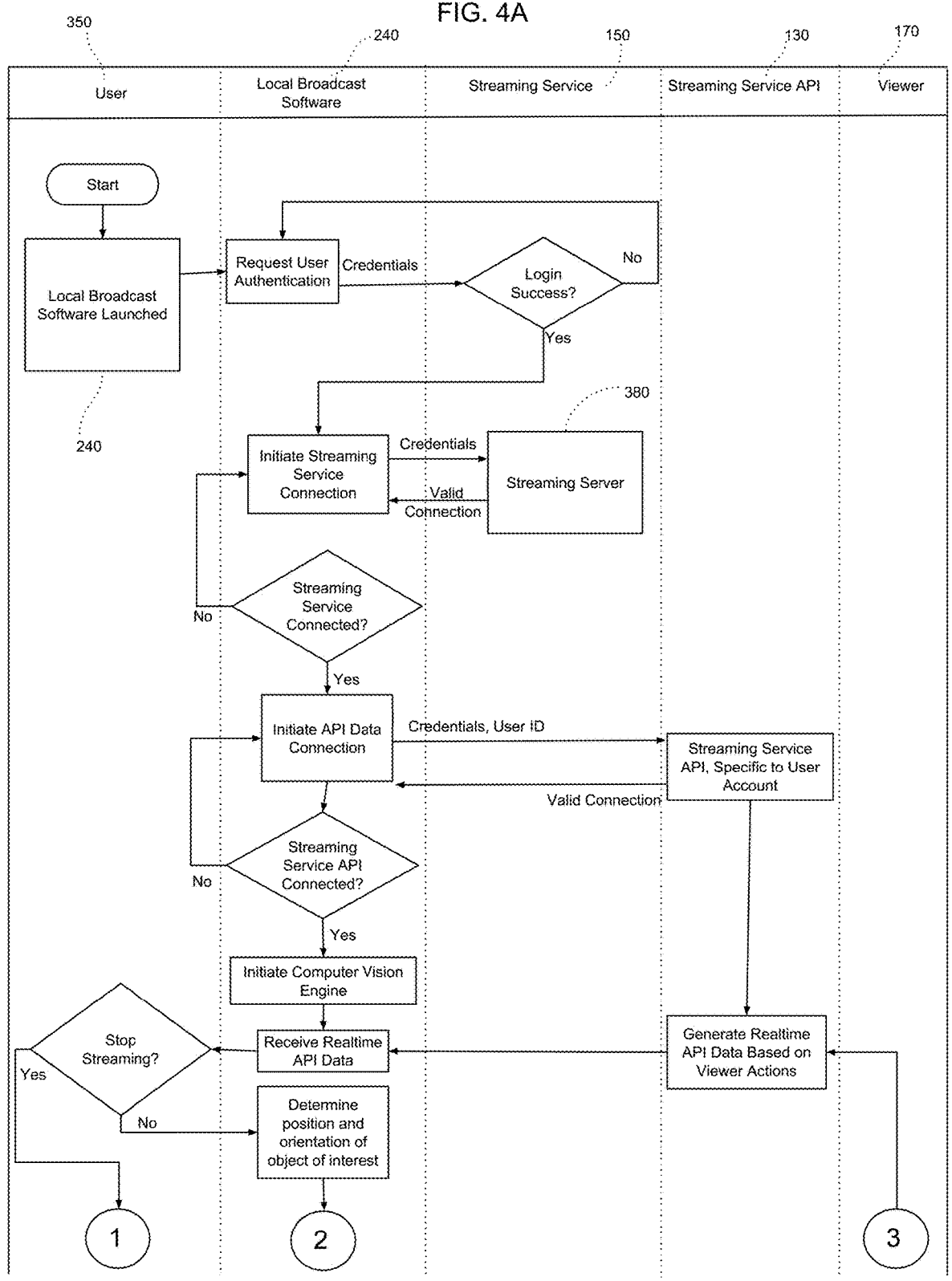
FIGS. 4A and 4B show a software flowchart and functional distribution for a first illustrative embodiment.
Figure 4B:
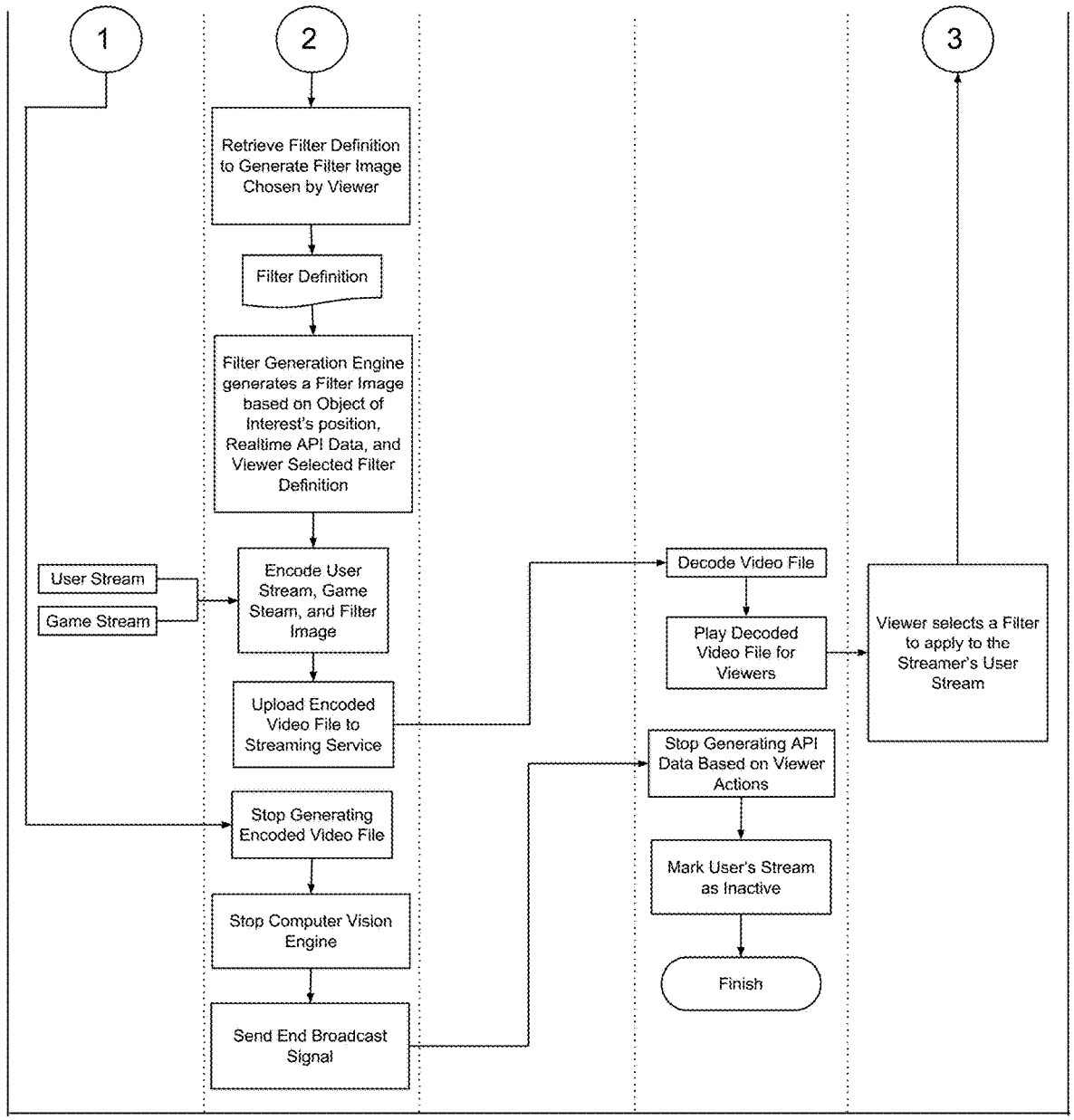

FIGS. 4A and 4B show a beginning-to-end illustrative process view of the disclosed methods, wherein the Local Broadcast Software 240 uses the Computer Vision Engine 440 and the Filter Generation Engine 460 to produce a Filter Image 450, which is combined with the User Signal 210 and the Game Signal 220 prior to encoding the video for streaming.

A User 350 launches the Local Software 240. The Local Software 240 may be executed by any type of a Local Computer 230, and it may be presented as a web page or a local application. The User 350 then uses the Local Software 240 to authenticate with the Server Infrastructure 100. Credentials are passed from the Local Software 240 to the Server Infrastructure 100, which validates the authentication attempt.

Once authenticated, the User 350 initiates a connection with the Streaming Service 150. The User's 350 credentials or API tokens are passed to the Streaming Server 380 via the Local Desktop Software 240, and the Streaming Server 380 returns an active connection to the Streaming Service 150. The Streaming Service API(s) 130 then reject the Local Broadcast Software's 240 connection attempts or confirm that the connection(s) are valid. If the connections are rejected, the Local Desktop Software 240 attempts to initiate the connection to the Streaming Service API(s) 130 again. If the connections are valid, the Local Desktop Software 240 begins receiving real time data events from the Streaming Service API(s) 130.

The Local Broadcast Software 240 then initiates the Computer Vision Engine 440, collects the user's Game Signal 220 and User Signal 210. The Local Broadcast Software 240 sends the user's Game Signal 220 and User Signal 210 to the Computer Vision Engine 440 for processing. When the appropriate trigger has been received via real time API data, the Local Broadcast Software 240 loads the selected Filter Definition 480 and initiates the Filter Generation Engine 460. The Computer Vision Engine 440 detects the position and orientation of the pre-defined object of interest. The Filter Generation Engine 460 then combines the position and orientation data with the Filter Definition 480 to produce the Filter Image 450. The sources are then encoded by the Video Encoder 190 with the Filter Image 450 and uploaded to the Streaming Service 150 using a Streaming Protocol 180, including but not limited to HLS, FLV, RTMP, RTSP, and DASH. Once uploaded to the Streaming Service 150, the encoded video file is decoded and played for Viewers 170 to consume.

As Viewers 270 select a filter to apply to the User's 350 stream on the Streaming Service 150, the Streaming Service API 130 records and converts the Viewer's 270 selection into a data format that can be easily shared with the Local Broadcast Software 240. The viewer may or may not be required to pay to apply the filter to the stream using pre-stored credit card information, pre-purchased tokens, coins, or currency specific to the Streaming Service 150. The application of the filter may or may not have a queue, where each filter must wait in line to be displayed.

The aforementioned process of encoding the sources to playback repeats until the User 350 decides to stop the broadcast. When the broadcast is stopped, the Local Broadcast Software 240 stops generating and uploading the encoded video file; it stops the Computer Vision Engine 440; it then sends a signal to end the broadcast, notifies the Streaming Service 150 to mark the User's 350 stream(s) as inactive, the Streaming Service API 130 stop generating data based on Viewer 170 actions, and the Local Broadcast Software 240 stops receiving data.

Second Illustrative Embodiment

Figure 5A:
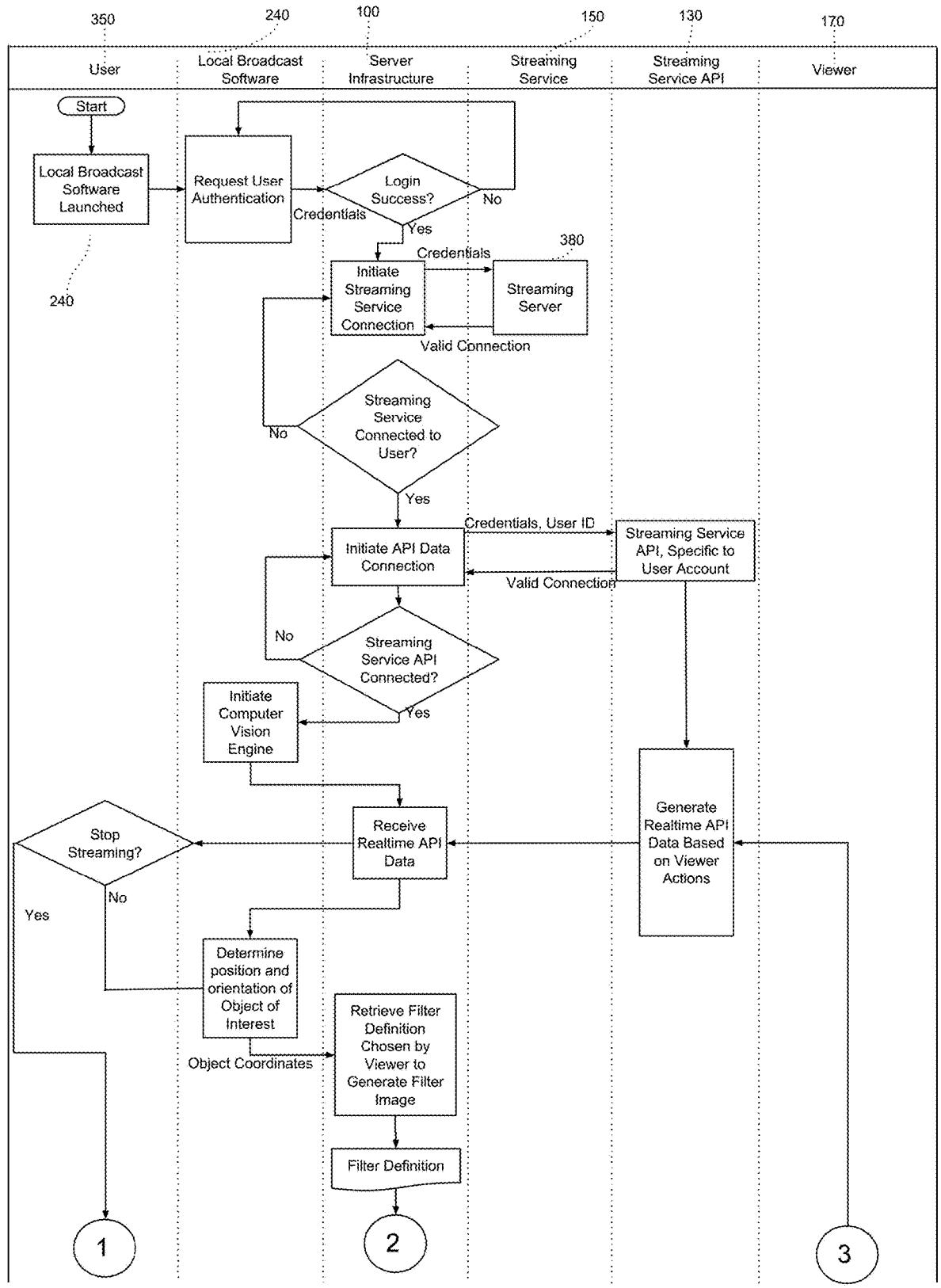
FIGS. 5A and 5B show a software flowchart and functional distribution for a second illustrative embodiment.
Figure 5B:
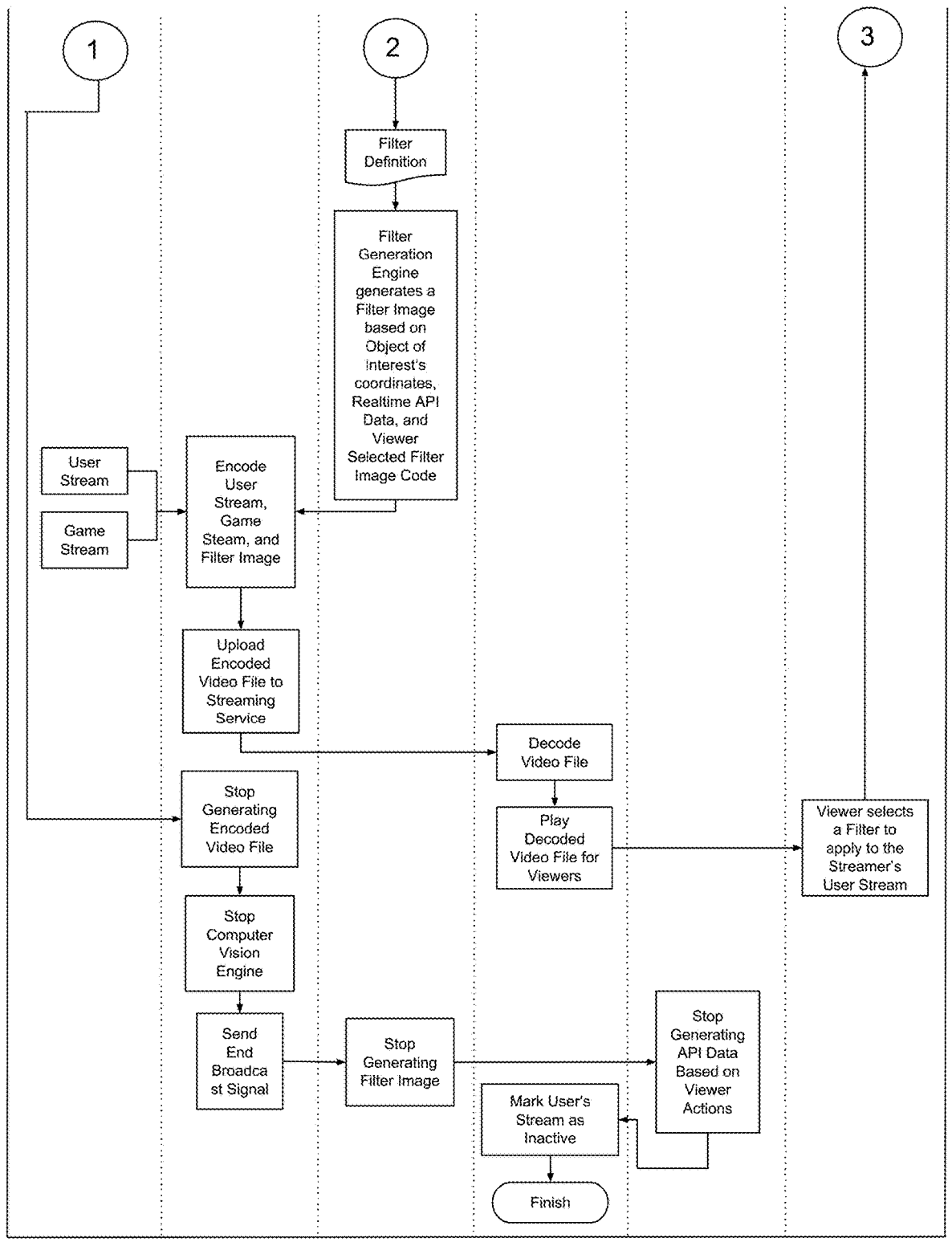

FIGS. 5A and 5B show a beginning-to-end illustrative process view of the disclosed methods, wherein the Local Broadcast Software 240 uses the Computer Vision Engine 440 to produce position data for an object of interest, which is sent to a Server Infrastructure 100 which uses the position data and the Filter Generation Engine 460 to produce a Filter Image 450, which sent to the Local Broadcast Software 240 where the Filter Image 450 is combined with the User Signal 210 and the Game Signal 220 prior to encoding the video for streaming.

A User 350 launches the Local Software 240. The Local Software 240 may be executed by any type of a Local Computer 230, and it may be presented as a web page or a local application. The User 350 then uses the Local Software 240 to authenticate with the Server Infrastructure 100. Credentials are passed from the Local Software 240 to the Server Infrastructure 100, which validates the authentication attempt.

Once authenticated, the Server Infrastructure 100 initiates a connection with the Streaming Service 150. The User's 350 credentials or API tokens are passed to the Streaming Server 380 via the Server Infrastructure 100, and the Streaming Server 380 returns an active connection to the Streaming Service 150. The Streaming Service API 130 then reject the Server Infrastructure's 100 connection attempt or confirms that the connection is valid. If the connections are rejected, the Local Desktop Software 240 attempts to initiate the connection to the Streaming Service API 130 again. If the connections are valid, the Server Infrastructure 100 begins receiving real time data events from the Streaming Service API 130.

The Local Broadcast Software 240 then initiates the Computer Vision Engine 440, collects the user's Game Signal 220 and User Signal 210. The Local Broadcast Software 240 sends the user's Game Signal 220 and User Signal 210 to the Computer Vision Engine 440 for processing.

When the Server Infrastructure 100 receives notice via Streaming Service API 130 data that a Viewer 170 has selected a filter, the Server Infrastructure 100 retrieves the selected Filter Definition 480 and notifies the Local Broadcast Software 240. The Local Broadcast Software then uses the Computer Vision Engine 440 to detects the position and orientation of the pre-defined object of interest. The position and orientation data are sent to the Server Infrastructure 100, which initiates the Filter Generation Engine 460. The Filter Generation Engine 460 combines the position and orientation data with the Filter Definition 480 to produce the Filter Image 450. The Server Infrastructure 100 sends the Filter Image 450 to the Local Broadcast Software 240.

The User Signal 210 and Game Signal 220 are then combined with the Filter Image 450 and encoded by the Video Encoder 190. The encoded video is uploaded to the Streaming Service 150 using a Streaming Protocol 180, including but not limited to HLS, FLV, RTMP, RTSP, and DASH. Once uploaded to the Streaming Service 150, the encoded video file is decoded and played for Viewers 170 to consume.

As Viewers 270 select a filter to apply to the User's 350 stream on the Streaming Service 150, the Streaming Service API 130 records and converts the Viewer's 270 selection into a data format that can be easily shared with the Server Infrastructure 100. The viewer may or may not be required to pay to apply the filter to the stream using pre-stored credit card information, pre-purchased tokens, coins, or currency specific to the Streaming Service 150. The application of the filter may or may not have a queue, where each filter must wait in line to be displayed.

The aforementioned process of encoding the sources to playback repeats until the User 350 decides to stop the broadcast. When the broadcast is stopped, the Local Broadcast Software 240 stops generating and uploading the encoded video file; it stops the Computer Vision Engine 440; it then sends a signal to end the broadcast; the Server Infrastructure 100 stops generating the Filter Images 450 and notifies the Streaming Service 150 to mark the User's 350 stream(s) as inactive; the Streaming Service API 130 stop generating data based on Viewer 170 actions, and the Local Broadcast Software 240 stops receiving data.

What is claimed:

1. A system comprising:
   non-transient storage media configured to store graphic content information and graphic content configuration information corresponding to a graphical overlay, wherein the graphic content information for the graphical overlay defines a visual and/or audio content of the graphical overlay, and wherein the graphic content configuration information for the graphical overlay specifies values for one or more settings that define application of the visual and/or audio content of the graphical overlay to video content;
   one or more processors configured by machine-readable instructions to:
   transmit, from a first computing platform to a second computing platform, information that facilitates presentation of views of a user interface, wherein a view of the user interface includes offers to apply graphical overlays to the video content associated with the first computing platform of the user and visual representations of the visual content of the graphical overlays to enable inspection of the offers;
   receive, from the second computing platform, a selection of the graphical overlay from the offers, wherein the selected graphical overlay includes instructions to apply the graphical overlays to the video content associated with the first computing platform;
   responsive to reception of the selection of the graphical overlay from the second computing platform:
   modify the video content to include the selected graphical overlay; and
   transmit the modified video content to a plurality of computing platforms such that each computing platform of the plurality of computing platforms simultaneously displays the modified video content,
   wherein the plurality of computing platforms includes the first and second computer platforms and any additional computing platforms within the plurality of computing platforms, and
   wherein subsequent modifications to the video content based on selected graphical overlays by any of the plurality of computing platforms causes each computing platform of the plurality of computing platforms to simultaneously display the subsequently modified video content.

2. The system of claim 1, wherein the video content associated with the first computing platform includes visual and/or audio content captured by the first computing platform, the visual content captured by the first computing platform including visual content defining one or more objects and/or a face of a user of the first computing platform.

3. The system of claim 2, wherein the visual content of the selected graphical overlay is positioned at a location with respect to an object within the video content.

4. The system of claim 2, wherein the visual content of the selected graphical overlay is positioned at a location with respect to the face of the user in the video content.

5. The system of claim 1, wherein the one or more settings that define the application of the visual and/or audio content of the selected graphical overlay to the video content includes one or more settings that specify a location where the visual content of the selected graphical overlay is applied to the video content, one or more settings that specify a duration of the selected graphical overlay is applied to the video content, and/or one or more settings that specify a real-time event trigger defining when the selected graphical overlay is applied to the video content.

6. The system of claim 5, wherein the one or more settings specifying the location where the visual content of the selected graphical overlay is applied to the video content is a location relative to a face of the user in the video content.

7. The system of claim 1, wherein the offers to apply the graphical overlays to the video content associated with the computing platform includes offers to apply the graphical overlays for free and/or offers to apply the graphical overlays for a fee.

8. The system of claim 1, wherein the one or more processors are further configured by machine-readable instructions to facilitate modification of the selected graphical overlay by the user.

\* \* \* \* \*